United States Patent [19]

Kinzenbaw et al.

[11] Patent Number: 5,346,019
[45] Date of Patent: Sep. 13, 1994

[54] AGRICULTURAL IMPLEMENT WITH COMMON MECHANISM FOR RAISING/LOWERING AND ROTATING A LIFT FRAME ABOUT A VERTICAL AXIS

[75] Inventors: Jon E. Kinzenbaw, Williamsburg; Alan F. Barry, Fairfax; Harry C. Deckler, Williamsburg, all of Iowa

[73] Assignee: Kinze Manufacturing, Inc., Williamsburg, Iowa

[21] Appl. No.: 22,991

[22] Filed: Feb. 26, 1993

[51] Int. Cl.⁵ .................. A01B 49/00; A01B 63/32
[52] U.S. Cl. .................. 172/311; 280/412; 111/57; 172/457; 172/458; 172/477
[58] Field of Search .............. 172/310, 311, 452, 456, 172/254, 574, 458, 463, 457, 668, 675, 662, 206, 209, 219, 224, 229, 776, 481, 476, 477; 111/57; 86/238, 473.5; 280/412, 413

[56] References Cited

U.S. PATENT DOCUMENTS

| | | | |
|---|---|---|---|
| 3,356,301 | 12/1967 | Barber et al. | 111/57 |
| 4,117,893 | 10/1978 | Kinzenbaw | 172/311 |
| 4,506,904 | 3/1985 | Kinzenbaw | 280/415 R |
| 4,721,168 | 1/1988 | Kinzenbaw | 172/311 |
| 4,932,197 | 6/1990 | Allen | 56/228 |
| 5,129,463 | 7/1992 | Handy | 172/310 |

Primary Examiner—Randolph A. Reese
Assistant Examiner—Spencer Warnick
Attorney, Agent, or Firm—Emrich & Dithmar

[57] ABSTRACT

An agricultural implement, such as a row crop planter, has a main carrier frame drawn by a tractor and including support wheels. Individual row units are mounted on a lift frame. The carrier frame includes a cornered lift post which is mounted for rotation about a vertical axis. A cornered sleeve or collar in the form of a tube is mounted to the lift frame for vertical sliding motion on the lift post. A lift hydraulic cylinder couples the lift frame to the carrier frame for setting the lift frame in (i) a use position wherein the row units are lowered to engage the soil; (ii) an intermediate, raised position wherein the row units are disengaged, for negotiating end turns; or (iii) a fully raised position wherein the lift frame and row units may be rotated from a transverse position to a longitudinal position, to narrow the implement for road travel. A swing hydraulic cylinder is arranged to rotate the lift post when the lift frame is raised to the uppermost position, to torque the lift frame to a longitudinal position for transport.

23 Claims, 11 Drawing Sheets

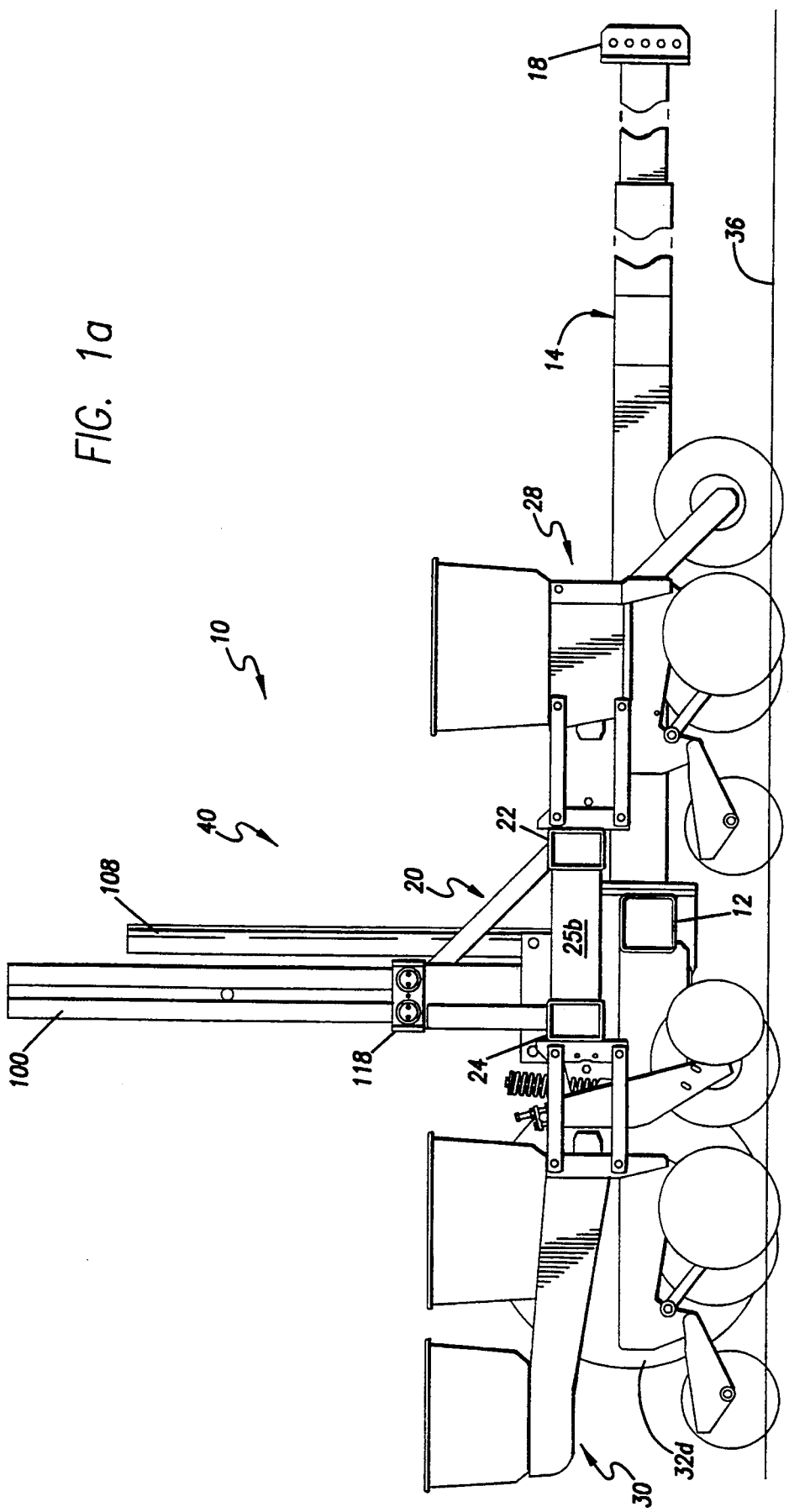

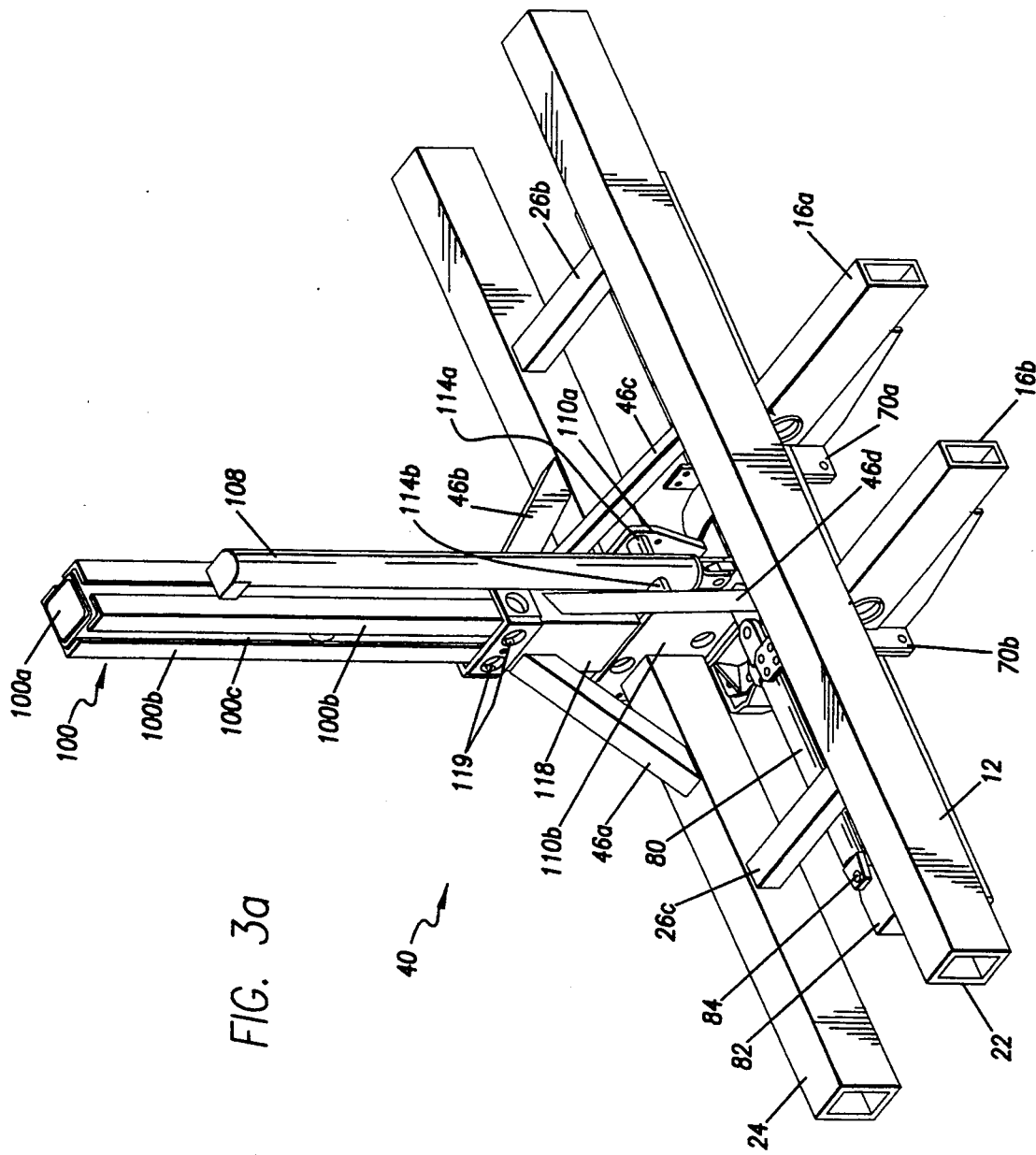

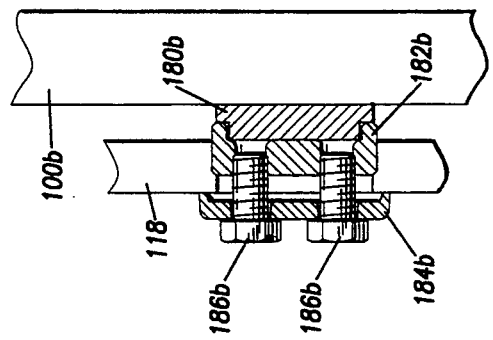
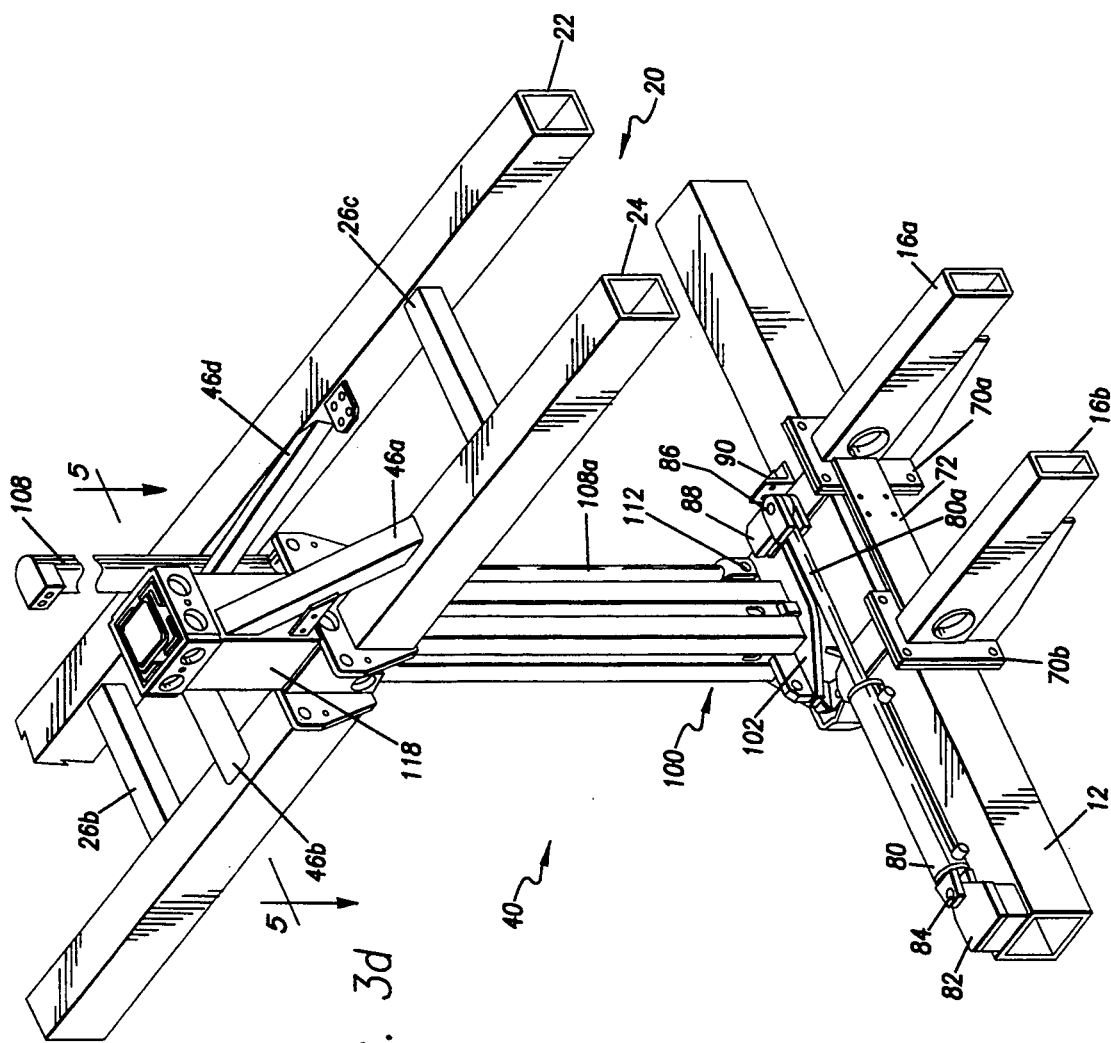

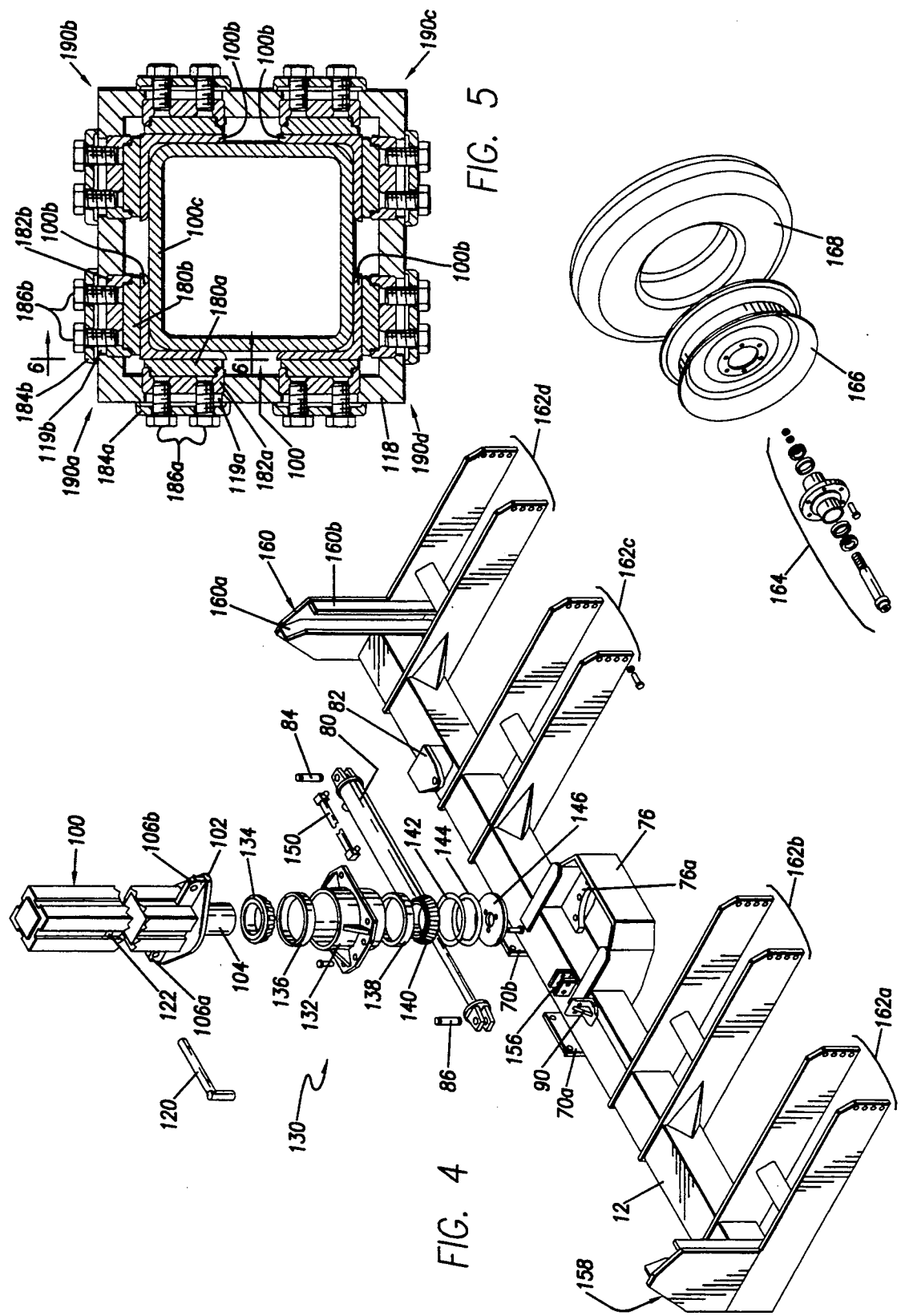

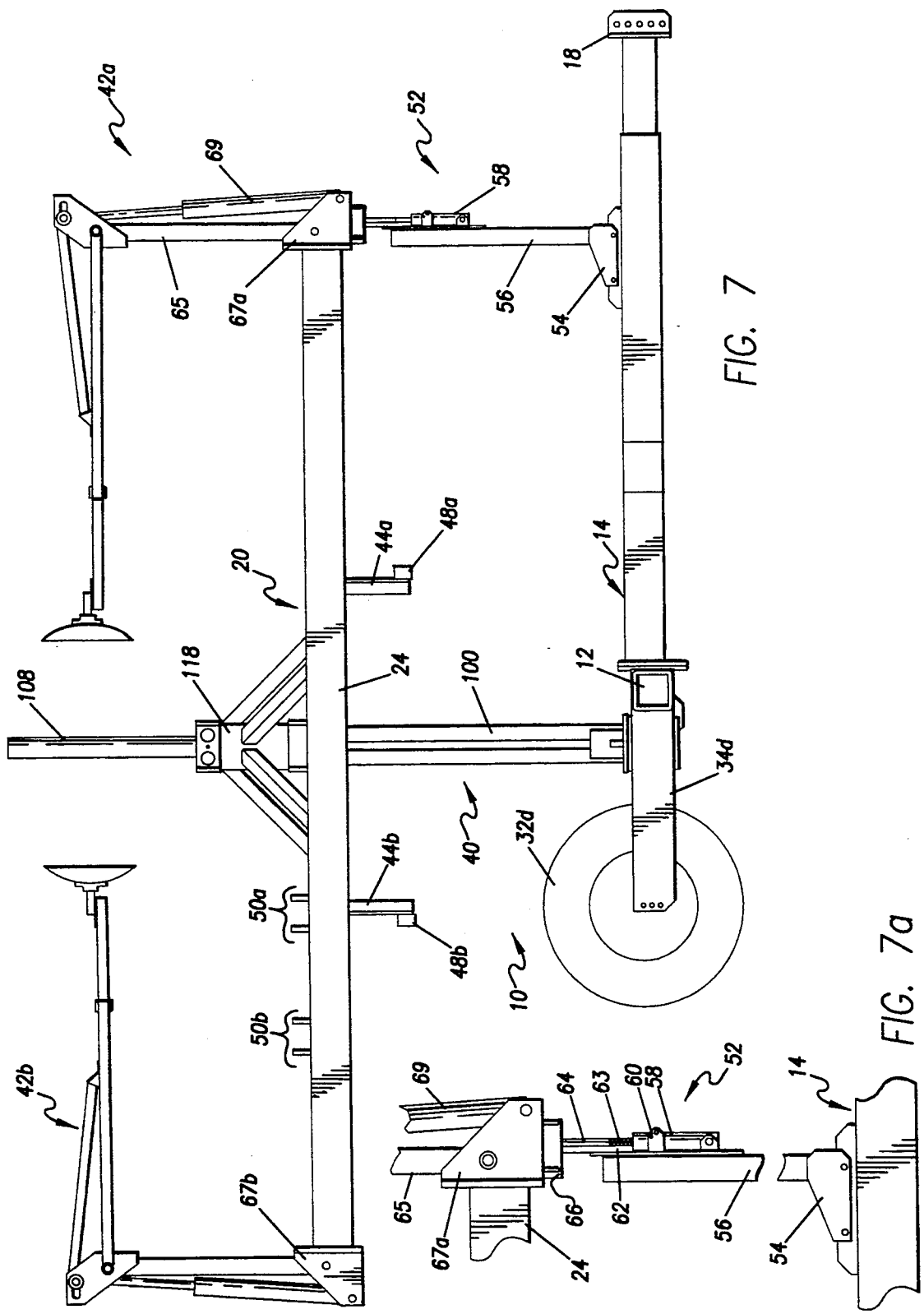

AGRICULTURAL IMPLEMENT WITH COMMON MECHANISM FOR RAISING/LOWERING AND ROTATING A LIFT FRAME ABOUT A VERTICAL AXIS

FIELD OF THE INVENTION

This invention relates generally to agricultural implements and is particularly directed to large agricultural implements adapted for pulling by a tractor which must also be adapted for road transport. The invention is illustrated and described as embodied in a row crop planter which may extend sixty-five feet or more in the use position, but which also must be capable of transport over roads of standard width. However, it may equally well be adapted to other agricultural implements such as cultivators or disc plows.

BACKGROUND OF THE INVENTION

Increased tractor horsepower has resulted in larger implements capable of planting or working a much wider swath in a single pass. Transport of these wide implements from a storage area to a field or from one field to another over roads has become an important design consideration. Some early planters required separate trailers for transport. In addition to the cost of these special-use transport trailers, these planters are limited in length by the practical requirements of having to load the implement on the trailer and to unload it. The time involved with the use of a separate trailer is increased because in loading the implement on the trailer and then in setting up the implement in the new field, the tractor must be unhitched from the implement and then hitched to the trailer, with the reverse procedure followed at the new site. This loss of time can be significant in view of the short time typically available when good planting conditions prevail, particularly when numerous fields must be planted using the same implement.

Other attempts to facilitate transport of larger implements include frames with pivoting wing sections on which row units are mounted which may be vertically folded. When folded, the implement is much greater in height, frequently causing problems when attempting to pass under bridges, through gates and into storage buildings. In addition, even with the two outer wing sections folded, because of the increasing size of agricultural implements, the fixed center section may also restrict transport and storage of the implement.

One improvement in planter design is disclosed in my U.S. Pat. No. 4,117,893. This design allows the planter bar to fold rearwardly about its centerline, with links used to lock the two side sections, or wings, either in the use position, wherein the mounting bars are aligned and transverse to the direction of travel, or in the transport position in which the mounting bars for the two sets of row units are folded rearwardly and are parallel to the direction of travel of the tractor. Another improvement in planter design is represented by the system disclosed in my U.S. Pat. No. 4,506,904. This system permits the planter bar to be transported end-wise rather than by folding. My U.S. Pat. No. 4,721,168 discloses another improvement in large implement transport and storage which employs a cylindrical vertical pivot post for rotating a lift frame in combination with four bar linkage for raising and lowering the lift frame on a carrier frame.

SUMMARY OF THE INVENTION

The present invention is shown in the form of a planter having a main carrier frame with ground support wheels. The carrier frame is pivotally attached to a tractor by a hitch tongue which may be of the telescoping type. The tongue may be retracted for planting use to facilitate turning corners at a lower turn radius, and may be extended for transport to accommodate the planter, or "lift" frame in an end-wise or "longitudinal" disposition for transport. The lift frame is carried by the main carrier frame by means of a lift mechanism which is designed to rotate the lift frame, when it is raised, from the transverse position to the longitudinal position. The lift mechanism includes an upright cornered post or column mounted to the carrier frame for rotation about a vertical axis and a corresponding cornered tubular sleeve or collar mounted to the lift frame. In the embodiment illustrated, the sleeve and the lift post are generally square in cross section, with the lift post received in the sliding sleeve in close-fitting relation, with bearing pads provided to reduce friction between the sleeve and the post. With the lift post rotatably mounted to and extending vertically upward from the carrier frame's axle, one or more hydraulic cylinders are provided for raising and lowering the lift frame relative to the carrier frame. The lift frame is lowered to permit the row units (or discs or sweeps in the case of a cultivator) to engage the soil and is raised to a full up position for transport. The unit-bearing lift frame may also be raised to an intermediate position for allowing the implement to be turned in a field such as the end of a row. With the lift frame in the full up position, the lift post may be rotated about 90° by means of a horizontal hydraulic cylinder (sometimes referred to as the "swing" cylinder) so that the raised lift frame is moved from the transverse position to a longitudinal position in which the lift frame extends parallel to the direction of travel of the tractor for transport, but the carrier frame remains transverse.

Stability is maintained between the lift frame and the vertical lift post by a plurality of adjustable sliding bearing pads. The vertical lift post is in the form of a multi-sided elongated, columnar member with corrosion resistant angled corners providing bearing surfaces or rails. Each slide bearing is comprised of a bearing material compatible with the material used in the angled corners, and includes an adjustment arrangement for controlling the clearance between the inner lift post and outer sleeve. In the illustrated embodiment, the lift post is square, the corner surfaces are 90° angles, and the clearance adjustment includes a plurality of adjustable low friction pads. Other combinations of components such as shims, jack bolts, or other means could as easily be used for adjusting the sliding engagement between the lift post and the sleeve. In addition, other cross-sections of the lift post and sleeve or a slot-and-key arrangement may be used provided that when the lift post is rotated while in the uppermost position, the sleeve and lift frame are also rotated.

The described arrangement for raising and lowering the lift frame on the carrier frame maintains the distance between the center of gravity of the lift frame and the axis of the lift post substantially constant during raising and lowering of the lift frame. The weight and balance of the implement therefore does not shift between the implement's transport wheels and draw bar. The invention may employ only one cylinder for raising and lowering the lift frame requiring a reduced amount of fluid in the tractor's hydraulic system and employs a reduced number of components in a simplified construction. In addition, direct, vertical movement of the lift frame between the lowered and raised positions reduces the time required for the raising and lowering operation.

BRIEF DESCRIPTION OF THE DRAWING

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1a is a right side view of the planter with the row units and lift frame in the use position;

FIG. 3a is a perspective view of the lift/rotate assembly for displacing the lift frame where the lift frame is shown in the full down, use position;

FIG. 3d is a perspective view of the lift/rotate assembly showing the lift frame in the fully upraised and rotated position;

FIG. 4 is an exploded perspective view of the carrier frame portion of the lift/rotate assembly for displacing the lift frame;

FIG. 5 is a transverse sectional view showing details of the sliding coupling arrangement for connecting the carrier and lift frames;

FIG. 6 is a vertical sectional view of the sliding coupling arrangement in the lift/rotate assembly;

FIG. 7 is a right side view of the planter with the row units omitted for clarity and the lift frame in the upraised, rotated non-use position and maintained in that position by means of a transport latch mechanism;

FIG. 7a is a side view of the transport latch arrangement which secures the lift frame to the hitch tongue in the transport position;

FIG. 7b is a front view of the transport latch arrangement of FIG. 7a; and

DETAILED DESCRIPTION OF THE PREFERRED EMBODIMENTS

Figure 1:
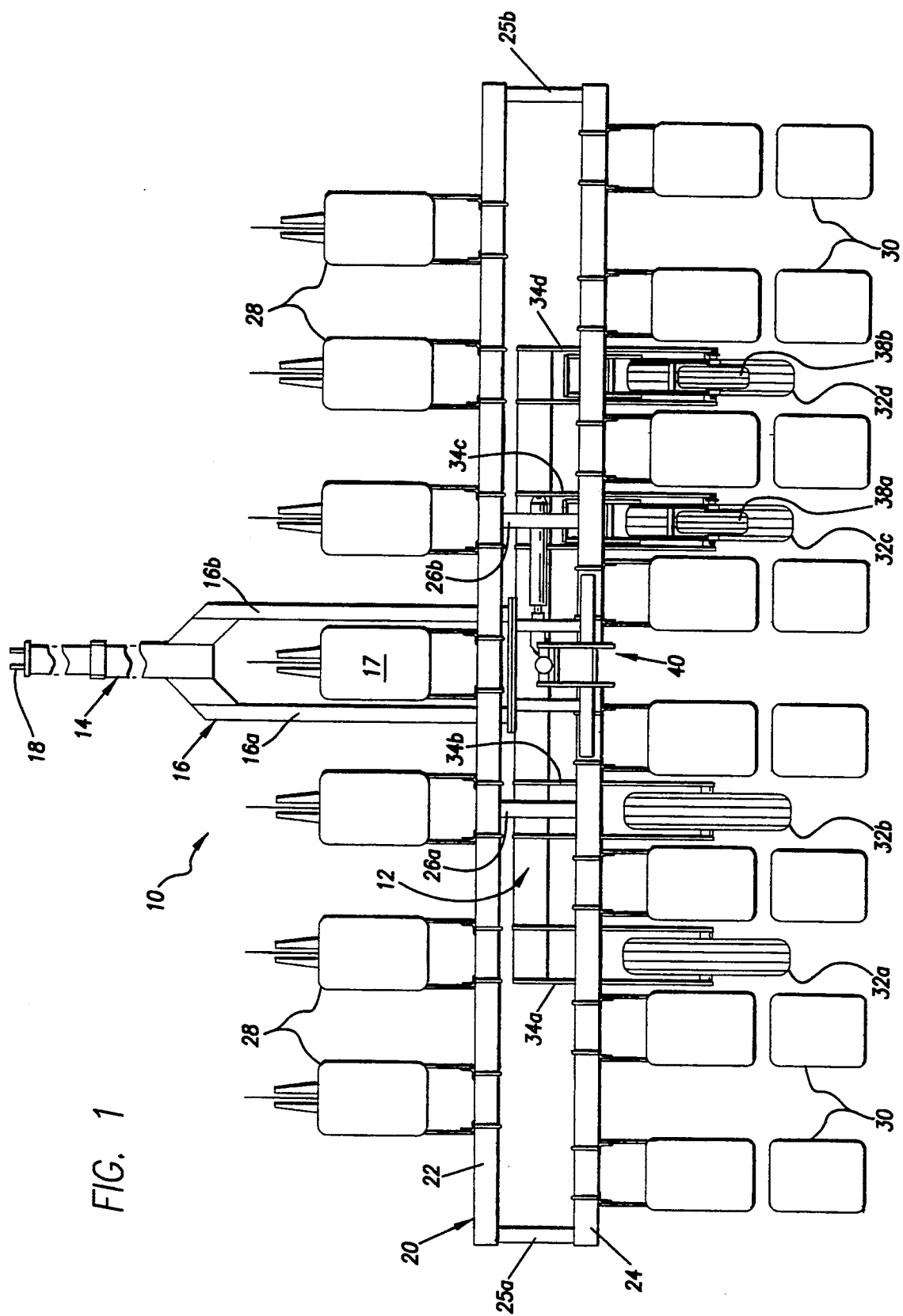
FIG. 1 is a plan view of a planter incorporating the present invention in the use position.

Referring to FIG. 1, there is shown a plan view of an agricultural row crop planter 10 incorporating the present invention. A right side view of the planter 10 shown in FIG. 1 is illustrated in FIG. 1a. The planter 10 includes a telescoping tongue 14 which includes, at its forward end, a hitch extension weldment 18 for attaching to the tractor hitch. The rear of tongue 14 includes a bifurcated section 16 having left and right side members 16a and 16b which are spaced apart to permit a forward, central row unit 17 to be located on the centerline of the planter 10. The rear of the bifurcated section 16 is rigidly attached to a main carrier frame, or axle, 12. In the illustrated embodiment, the carrier frame 12 is provided with four large, trailing support wheels 32a–32d. The support wheels 32a–32d ride on the soil 36 (FIG. 1a) as the planter 10 is drawn through a field by a tractor. The vertical and horizontal position of the main carrier frame 12 relative to the support wheels 32a–32d is fixed by rearwardly extending strut frames 34a–34d which respectively couple support wheels 32a–32d to the main carrier frame.

Supported on the main carrier frame 12 is a planter lift frame generally designated 20. Lift frame 20 may include three sections (i.e., two pivoting wings), although only one, rigid section is shown in FIG. 1. Lift frame 20 includes a forward mounting bar 22 and an aft mounting bar 24 which are rigidly connected together by a pair of outer transverse frame members 25a and 25b and a pair of inner transverse frame members 26a and 26b. The forward and aft mounting bars 22, 24 of the lift frame 20 are further coupled together by structural members in a lift/rotate assembly 40 disposed adjacent the center of each of the mounting bars which is described in detail below.

Mounted to the forward mounting bar 22 in a spaced manner are a plurality of pusher-type planter row units 28, where the aforementioned central row unit 17 is also of the pusher-type. A plurality of rear, pulled-type row units 30 are mounted to the aft mounting bar 24 in a trailing manner. Seven pusher-type row units 28, including the center row unit 17, are mounted to the forward mounting bar 22, while eight pulled-type row units 30 are shown mounted to the aft mounting bar 24. It should be noted that the forward, pusher-type row units are off-set from the rear, pulled-type row units so as to provide for the simultaneous working of 15 spaced rows. Each of the planter row units is conventional. First and second contact tires 38a and 38b respectively engage support wheels 32c and 32d and provide for driving the seed meters of the row units. Although the invention is illustrated in the form of a row crop planter with individual row units, the present invention is equally as well suited for other wide implements, as persons skilled in the art will readily appreciate. For example, the working units could be tillage tools, or cultivator blades or points, or spraying attachments or fertilizer applicators (all referred to as "working units").

Figure 1B:
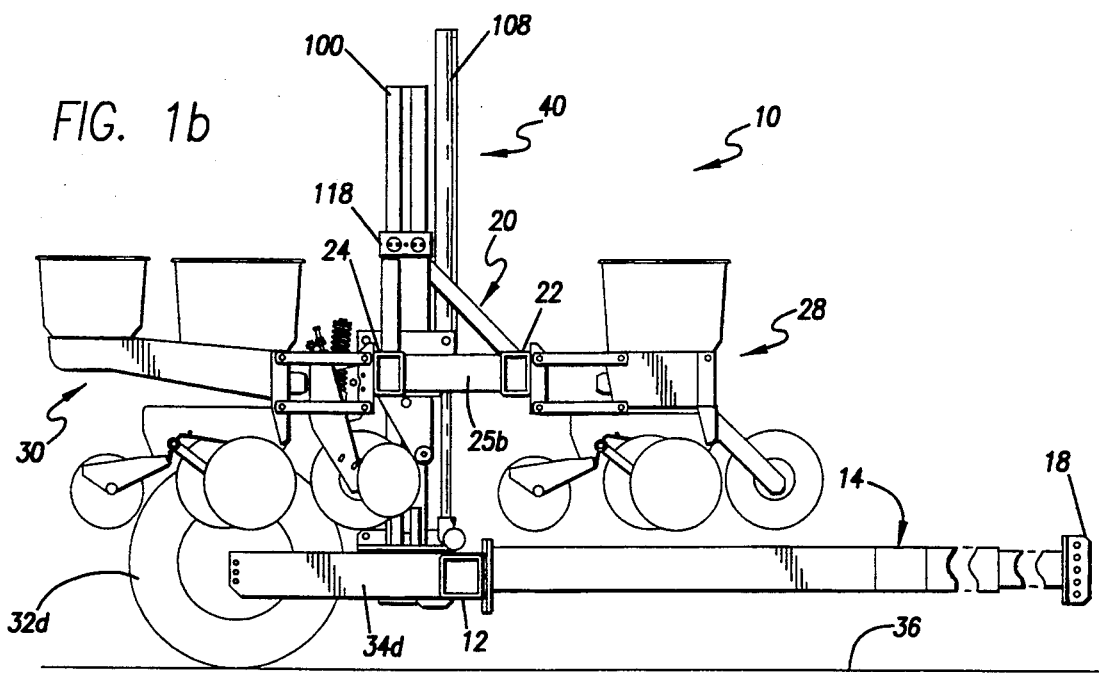
FIG. 1b is a right side view of the planter with the row units and lift frame in an intermediate upraised position.

The lift frame 20 is coupled to the carrier frame 12 by means of the aforementioned lift/rotate assembly 40 disposed on the centerline of the planter 10. The lift/rotate assembly 40, details of which are described below, permits the lift frame 20 to be lowered to the full down, use position as shown in FIG. 1a, wherein the working units engage the soil. The lift/rotate assembly 40 further allows for the raising of the lift frame 20 to an intermediate position above the carrier frame 12 as shown in FIG. 1b. With the lift frame 20 in the intermediate upraised position shown in FIG. 1b, the working units are raised above the soil and the planter 10 is in a position to be easily maneuvered by the tractor such as in turning at the end of a row. After the turn is completed, the lift/rotate assembly 40 lowers the lift frame 20 to the position shown in FIG. 1a for resuming the soil engaging operation.

Figure 1C:
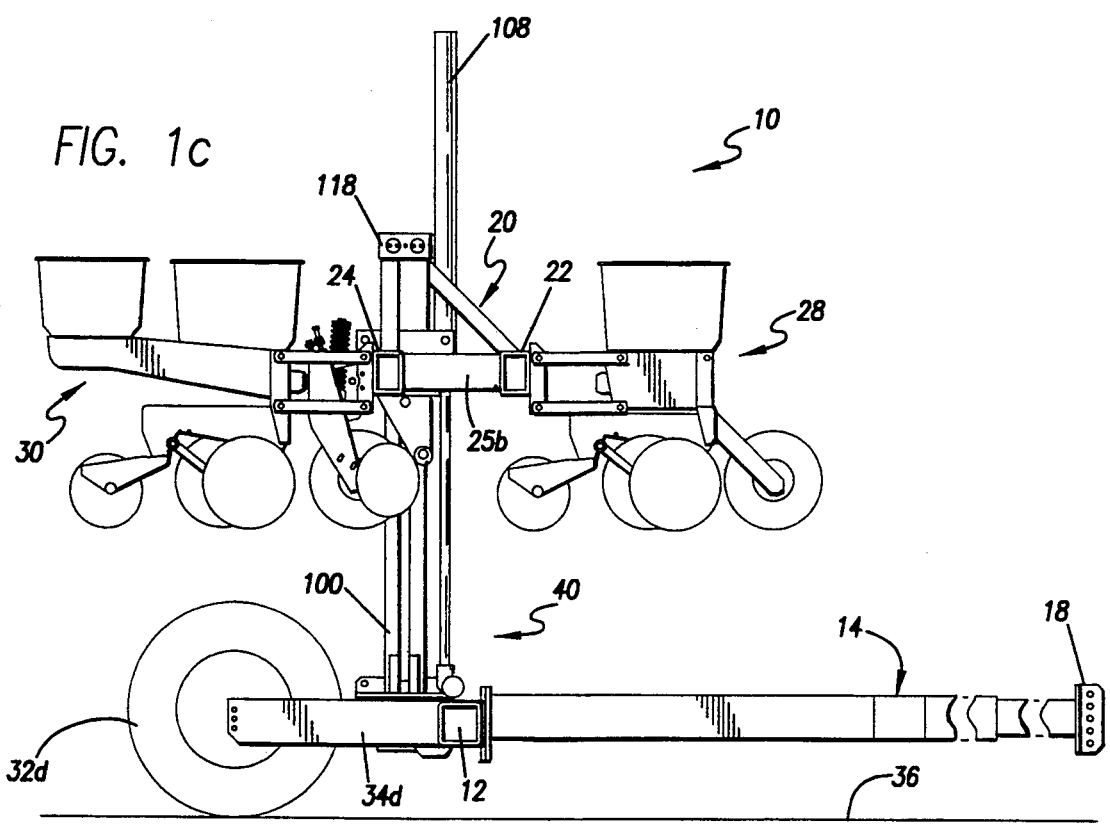
FIG. 1c is a right side view of the planter with the row units and lift frame in the fully upraised position.
Figure 2:
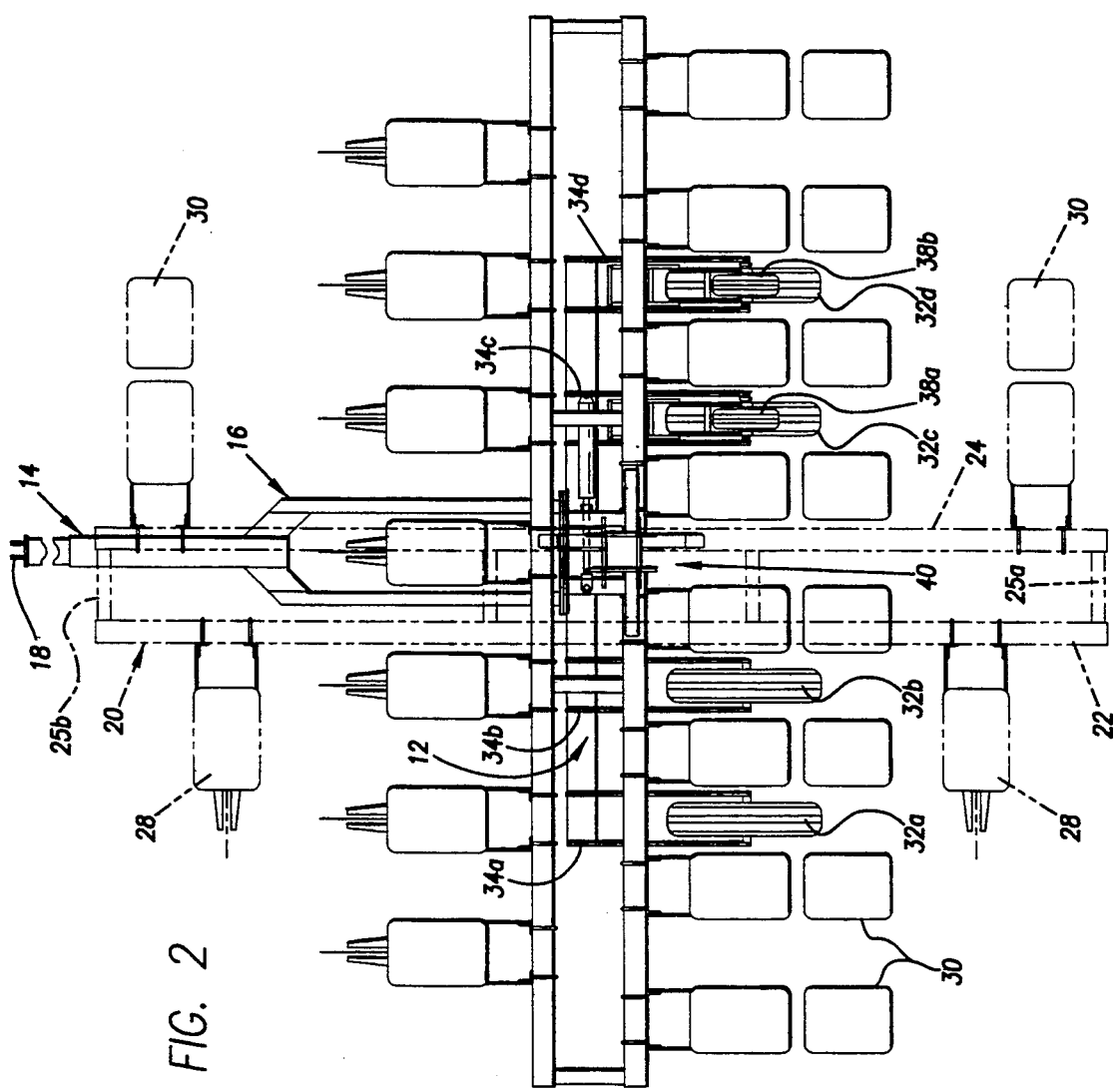
FIG. 2 is a plan view of the planter showing the row units and lift frame in the use position in solid lines and in the non-use, or transport, position in dotted-lines.
Figure 8:
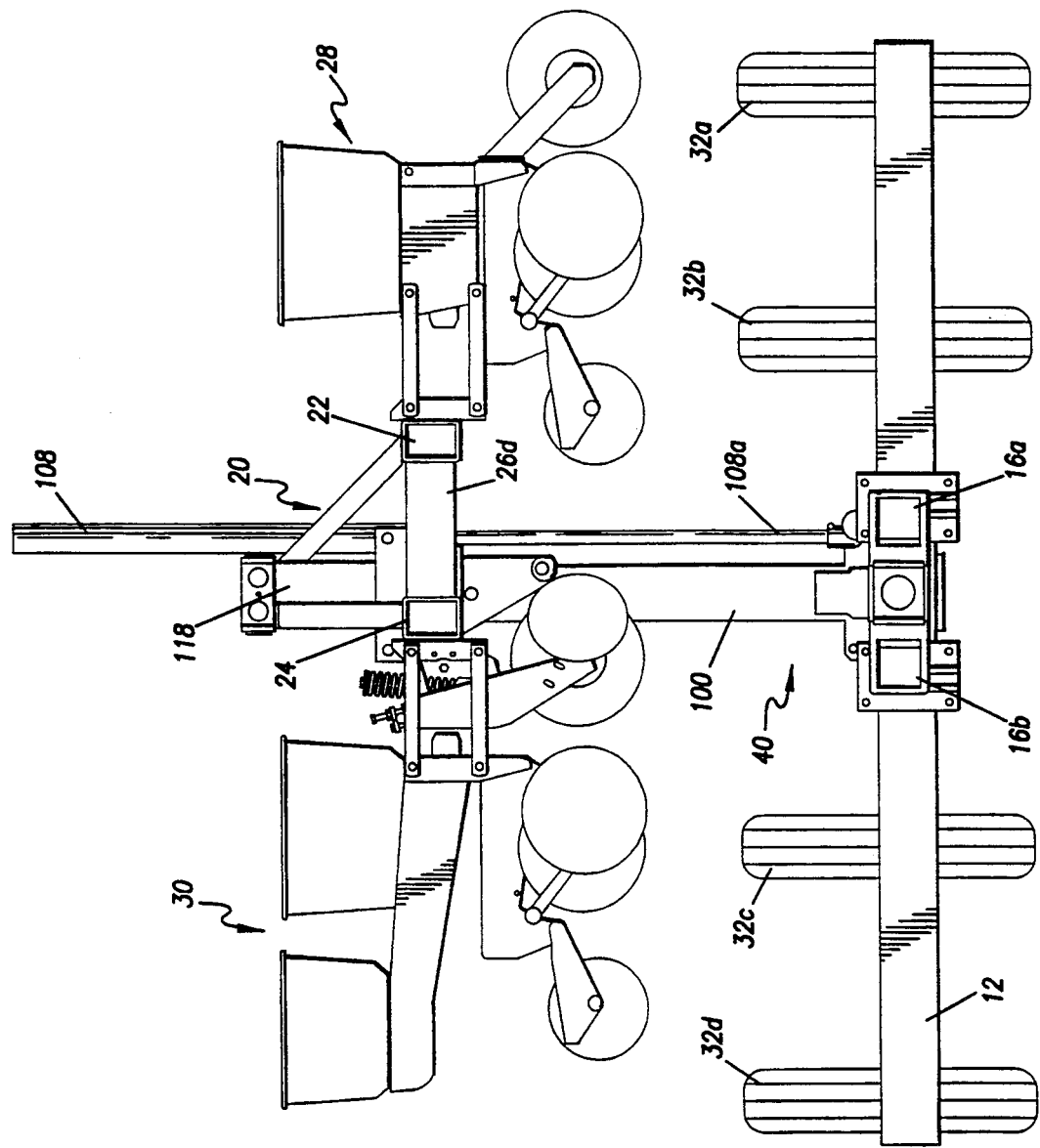
FIG. 8 is a front view of the planter showing the lift frame in the upraised, rotated non-use position.

A pin 120 is received in a cross hole 122 (FIG. 4) in the lift post to limit the upward movement of the lift frame at the intermediate position. If pin 120 is removed, the lift/rotate assembly 40 allows the lift frame 20 to be raised to a second, higher elevated position such as shown in FIG. 1c. With the lift frame 20 in the fully upraised position as shown in FIG. 1c, the lift/rotate assembly 40 rotates the lift frame to what is referred to as the "longitudinal" position (as distinguished from the transverse position of FIGS. 1a and 1b), in which the lift frame is generally parallel to the direction of travel of the planter 10 as shown in dotted-line form in FIG. 2. The pin 120 may then be reinserted for safety during transport to prevent the lift frame from lowering unintentionally. A front view of the planter 10 with the lift frame 20 in the full up, rotated position for transport and storage is shown in FIG. 8. Details of the manner in which the lift/rotate assembly 40 raises, lowers and rotates the lift frame 20 on the carrier frame 12 are described below.

Figure 3B:
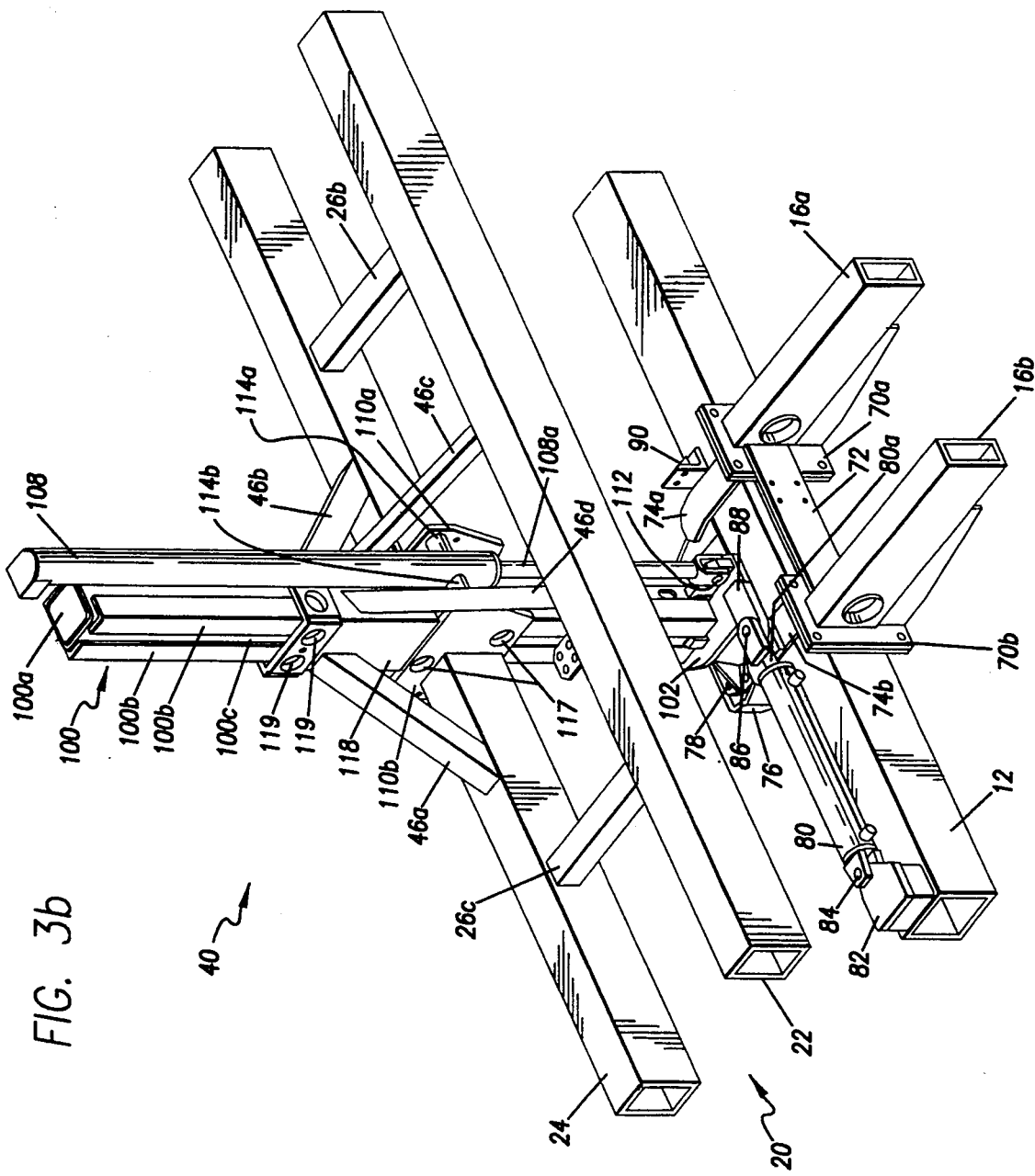
FIG. 3b is a perspective view of the lift/rotate assembly for displacing the lift frame where the lift frame is shown in an intermediate upraised position.
Figure 3C:
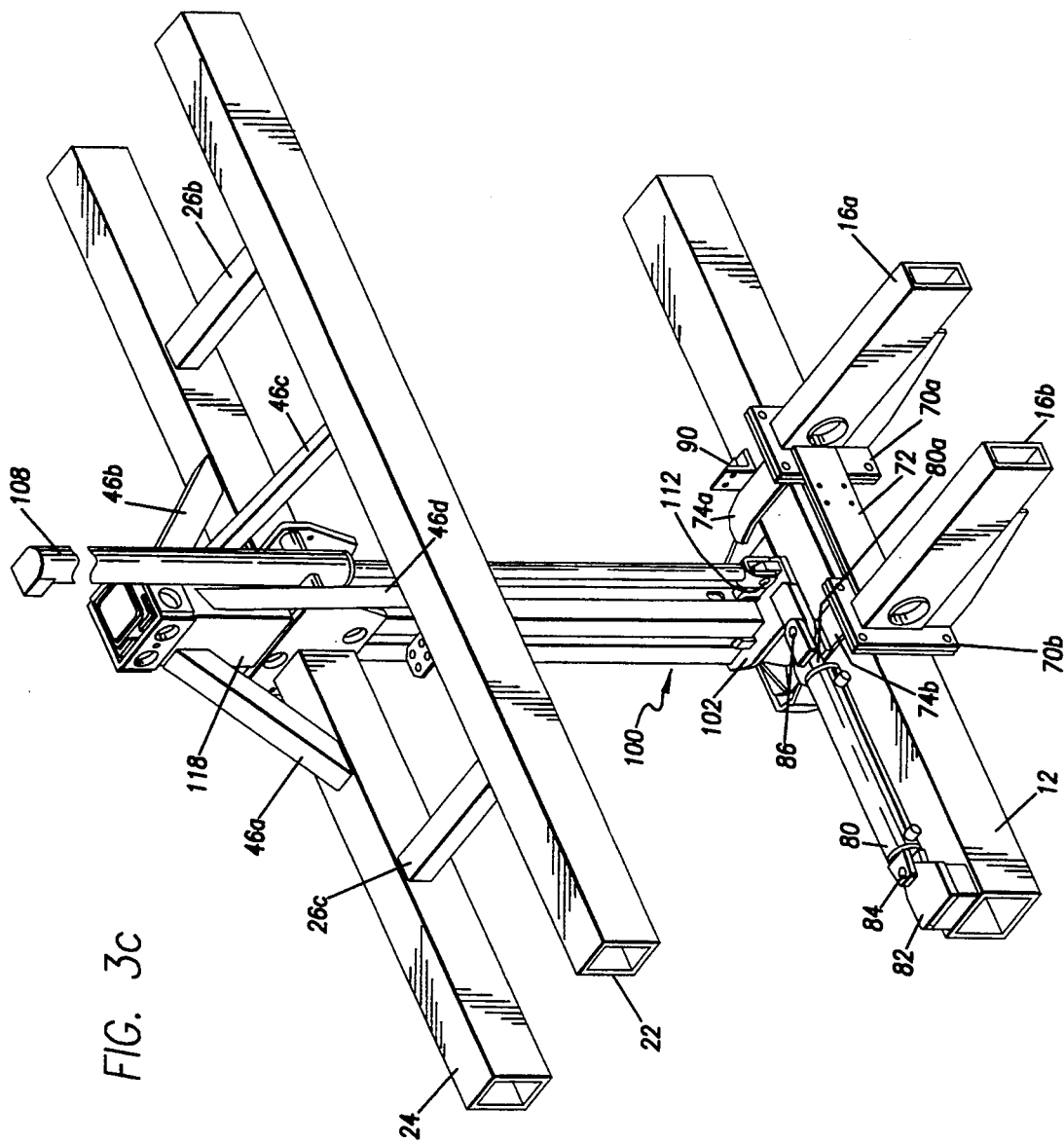
FIG. 3c is a perspective view of the lift/rotate assembly for displacing the lift frame showing the lift frame in the fully upraised position.

Referring to FIG. 3a, there is shown a perspective view of the lift/rotate assembly 40 in the full down position. FIGS. 3b, 3c and 3d are perspective views of the lift/rotate assembly 40 respectively showing the lift frame 20 in the intermediate upraised, full upraised, and full upraised and rotated positions. FIG. 4 is an exploded perspective view of the lift/rotate assembly 40 which will now be described in detail. The lift/rotate assembly 40 includes a cornered vertical lift post 100 having a generally square cross section which is mounted to a support bracket, or shelf, 76. Support bracket 76 is mounted to the carrier frame 12 by paired axle gussets 74a and 74b and mounting plates 70a and 70b. Mounting plates 70a, 70b in combination with a mounting plate coupling 72 are also used for attaching the left and right side members 16a, 16b of the tongue 16 to the carrier frame. Support bracket 76 is disposed on a rear portion of the carrier frame 12 and includes a generally circular aperture 76a therein. Inserted in aperture 76a and mounted to support bracket 76 is a bearing hub, or housing, 132. The vertical lift post 100 includes a cylindrical inner shaft extension 104. The shaft 104 is disposed within the bearing hub 132. Disposed within a lower portion of the bearing hub 132, proceeding from top to bottom, are a lower bearing cup 138, a lower bearing cone 140, a shim pack 142, an 0-ring 144 and a bearing retainer 146. Disposed in the upper portion of the bearing hub 132 are an upper bearing cone 134 and an upper bearing cup 136. These various components maintain the upper and lower bearing cones 134 and 140 in position within the bearing hub 132 and form a bearing assembly 130 for receiving and supporting the shaft extension 104 of the vertical lift post 100. Bearing assembly 130 allows for the free rotational displacement of the vertical lift post 100 relative to the carrier frame 12.

The lift/rotate assembly 40 further includes a cornered sleeve or collar 118 in the form of a tube having a generally square inner cross section conforming to the outer configuration of the rotatable lift post 100 and adapted for close-fitting but slidable positioning about the vertical lift post 100. The vertical lift post includes a top cap 100a (FIG. 3b) and an inner tubular member 100c having a generally square cross section. Mounted to each of the corners of the inner square tubular member 100c is a corner angle 100b. A lower portion of the vertical lift post 100 includes a base plate 102 and first and second tabs 106a and 106b. Sleeve 118 is freely movable along the length of the vertical lift post 100, with provision made for adjusting the clearance between the sliding tube and the vertical lift post described in detail below. Tabs 106a and 106b allow the hydraulic cylinder 108 to be located either in front of or to the rear of tube 118, thus allowing it to be near the center of gravity, depending on whether the heavier attachments are to the rear of the post or forward of the post.

Sleeve 118 is securely coupled to the forward and aft mounting bars 22, 24 of the lift frame 20 by means of a plurality of tubular reinforcing struts, or braces, 46a-46d. Sleeve 118 includes a plurality of spaced bearing apertures 119 disposed in a spaced manner about an upper portion thereof. First and second mounting plates 110a and 110b are attached to respective sides of the sliding sleeve 118 and are further coupled to the aft mounting bar 24 of the lift frame 20. Disposed between and coupled to the first and second mounting plates 110a, 110b are a pair of cylinder gimbals 114a and 114b which are also attached to the body of a lift cylinder 108. Extending downward from lift cylinder 108 is its cylinder rod 108a. The distal end of cylinder rod 108a is coupled to the aforementioned second tab 106b of the lift post's base plate 102. Conventional means such as a connecting pin 112 is used to couple the cylinder rod 108a to the lift post's second tab 106b. Extension of the cylinder rod 108a from the lift cylinder 108 by the application of suitable hydraulic pressure raises the lift frame 20 relative to the carrier frame 12. As mentioned above, FIG. 3b shows the lift frame 20 in an intermediate upraised position, while FIG. 3c shows the lift frame in the fully upraised position relative to the carrier frame 12. Lift cylinder 108 is preferably of the double acting type for lowering the lift frame by hydraulic pressure.

Also attached to the carrier frame 12 by means of a mounting bracket 82 and connecting pin 84 is a rotation or swing hydraulic cylinder 80. Rotation cylinder 80 includes an extendable rod 80a coupled at its distal end by means of a connecting pin 86 to a tab 88 on the base plate 102. Swing cylinder 80 is further coupled to a suitable source of pressurized hydraulic fluid such that of the tractor towing the planter 10 and is preferably of the double-acting type. Extension of the cylinder rod 80a of swing cylinder 80 causes counter-clockwise rotation of the vertical lift post 100 as viewed from above as shown in FIG. 3d. Rotation of the vertical lift post 100 causes a corresponding rotational displacement of the lift frame 20 so that it is oriented longitudinally of the direction of motion of the planter.

Retraction of the cylinder rod 80a of the rotation cylinder 80 causes clockwise rotation of the vertical lift post 100 and lift frame 20 combination so that the lift frame assumes the transverse position shown in FIG. 3c, i.e., generally parallel to the carrier frame 12. Rotation of the lift frame 20 is accomplished with the lift frame in the fully upraised position. Thus, in preparing the planter for transport, the lift frame 20 is moved to the fully upraised position as shown in FIG. 3c, followed by rotation of the lift frame to assume the position shown in FIG. 3d. This is accomplished by actuation first of the lift cylinder 108 followed by actuation of the swing cylinder 80 by the tractor operator. Conversely, in preparing the planter 10 for use in a field, the swing cylinder 80 is first retracted so that the lift frame 20 is in the longitudinal position while remaining in the fully upraised position as shown in FIG. 3c. The tractor operator then actuates the lift cylinder 108 to lower the lift frame 20 to a position in close proximity to and above the carrier frame 12.

It will be observed that the rotation of the lift post 100 rotates or "torques" the lift frame about a stationary vertical axis defined by the axis of the lift post and without changing substantially the distance between the axis of the lift post and the center of gravity of the lift frame, row units and accessories connected to the lift frame. This is accomplished because of the interaction of the outer shape of the lift post and the tight-fitting, but slidable, confirming inner shape of the sleeve or collar 118 mounted to the lift frame. In the illustrated embodiment, the crosssection of the lift post and the central opening of the sleeve are square, but other cornered (i.e., non-circular) structures, though perhaps more expensive, could perform the function of rotating the lift frame equally well. In the alternative, the lift frame and lift post could be arranged to interlock only at the uppermost position of the lift frame so that the lift frame could be turned to the longitudinal position only for transport, as by a key and slot arrangement.

carrier

Also disposed on an upper portion of the frame 12 is a swing cylinder stop 90. Swing cylinder stop 90 engages tab 88 to prevent further extension thereof and to limit rotational displacement of the lift frame 20. Proper positioning of the swing cylinder stop 90 thus ensures parallel alignment of the lift frame 20 with the carrier frame 12 during transport. An adjustable rotation stop 156 may also be provided for limiting rotation of the lift frame 20 to a predetermined angle.

As shown in greater detail in FIG. 4, a plurality of paired support wheel mounting brackets 162a–162d are arranged in a spaced manner along the carrier frame 12. Adjacent aft ends of each of these paired support wheel mounting brackets 162a–162d is adapted to receive a respective support wheel axle/hub assembly 164 which is coupled to and provides support for a wheel/rim 166 and tire 168 combination. A support wheel is thus disposed between each pair of mounting brackets 162a–162d.

Disposed on respective ends of the carrier frame 12 are left and right lift frame guides/stabilizers 158 and 160, respectively. Each of the left and right lift frame guides/stabilizers 158, 160 includes a respective pair of leading and trailing guide rails which are shown in FIG. 4 as elements 160a and 160b for the right lift frame guide/stabilizer. Left and right cam follower assemblies 44a and 44b are coupled to and extend downward from the aft mounting bar 24 of the lift frame as shown in FIG. 7. Each pair of leading and trailing guide rails of the left and right frame guides/stabilizers 158, 160 forms a cam track for receiving a respective eccentric 48a, 48b on the distal ends of the left and right cam follower assemblies 44a, 44b when the lift frame 20 is lowered to the operating position. The spacing between the guide rails is greater at the upper end portions thereof to guide the cam followers. With each of the left and right cam follower assemblies 44a, 44b rigidly mounted to the lift frame 20 and coupled to a respective lift frame guide/stabilizer 158, 160, the lift frame is securely maintained generally parallel to the carrier frame 12 and transverse to the direction of travel when in the use, soil engaging position.

Referring to FIG. 5, there is shown a transverse sectional view showing details of the sliding coupling arrangement for connecting the carrier and lift frames by means of the inner vertical lift post 100 and outer sliding tube 118. In the illustrated embodiment, the vertical lift post 100 includes an inner square tubular member 100c disposed within the outer sleeve 118. The outer sleeve 118 is also generally square in cross section and includes a plurality of adjustable bearings 180a, 182b, 180b and 182b threaded into the sleeve 118.

Each of the bearings is located adjacent to and engages a respective corner of the post 100 which includes a corner angle 100b. The adjustable assemblies engage corner angle 100b as shown in FIG. 5. The first adjustable assembly is disposed within a bearing aperture 119a in the sliding tube 118 and includes a bearing pad 180a engaging corner angle 100b, an adjustment plug 182a, a cap 184a, and a pair of capscrews 186a. Capscrews 186a threadably engage adjustment plug 182a which, in turn, engages bearing pad 180a. Rotation of the adjustment plug 182 allows the clearance between the bearing pad 180a and the corner angle 100b to be adjusted to compensate for wear between pads 180b and corner angle 100b. The second adjustable assembly similarly includes a bearing pad 180b in contact with the corner angle 100b, an adjustment plug 182b, a cap 184b, and a pair of capscrews 186b. Rotation of the plug 182b permits inward or outward displacement of the bearing pad 180b in relation to the corner angle 100b. In this manner, the clearance between the inner square tubular member 100c and the sleeve 118 may be adjusted as desired. Capscrews 182a are used to lock the plug 182a to the tube 118 to prevent it from turning after adjustments are made.

Figure 7B:
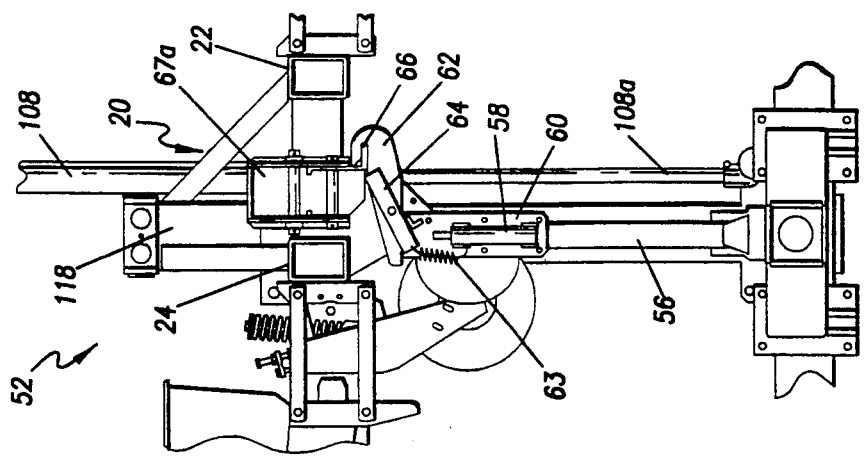

Referring to FIG. 7, there is shown a right-side view of the planter 10 with the row units omitted therefrom for simplicity, wherein the lift frame 20 is shown in the fully upraised position and aligned generally transverse to the carrier frame 12 for transport. The lift frame 20 is securely maintained in this position by means of a transport latch arrangement 52. An enlarged side view of the transport latch arrangement 52 is shown in FIG. 7a, while FIG. 7b is a front view of the transport latch arrangement also showing the lift frame 20 in the fully upraised, rotated position. Shown attached to the lift frame 20 are first and second contact tire mounts 50a and 50b to which the aforementioned contact tires are attached, with the contact tires omitted from FIG. 7 for simplicity.

Also attached to respective ends of the lift frame 20 are right and left foldable row marker units 42a and 42b. Each of the row marker units 42a, 42b is attached to the lift frame 20 by means of a respective pivot bracket 67a and 67b. With the lift frame 20 in the fully upraised, rotated position wherein it is aligned along the direction of travel of the planter, the right pivot bracket 67a is engaged by the transport latch arrangement 52 for securely maintaining the lift frame in this orientation. The right row marker unit 42a includes an outer frame member 65 pivotally coupled to the pivot bracket 67a and a hydraulic cylinder 69 for folding and unfolding the right row marker unit with respect to the lift frame 20.

Attached to the telescoping hitch 14 by means of a mounting bracket 54 is a generally vertically oriented elongated transport latch post 56. Mounted to the transport latch post 56 adjacent an upper end thereof by means of a mounting bracket 60 is a kick-out cylinder 58. Also attached to an upper end of the transport latch post 56 is the combination of a latch member 62 and pivoting lock bar 64. One end of lock bar 64 is coupled to the mounting bracket 60 by means of a coiled spring 63. Latch member 62 is adapted to engage a catch angle 66 attached to and extending downwardly from pivot bracket 67a. Coiled spring 63 urges the latch member 62 in a counter-clockwise direction as viewed in FIG. 7b to maintain latch member 62 in secure engagement with the catch angle 66. Actuation of the kick-out cylinder 58 causes clockwise rotation of the latch member 62 resulting in release of the catch angle 66 from the latch member, whereupon the lift frame 20 is free to rotate about the vertical lift post 100 in the lift/rotate assembly 40.

There has thus been shown an agricultural implement with a common mechanism for raising/lowering and rotating a lift frame about a fixed vertical axis without substantially changing the distance between the axis of the lift post and the center of gravity of the lift frame and working units. With a plurality of working units attached to the lift frame in a spaced manner, the lift frame is supported by a carrier frame. The lift frame is oriented generally parallel to the carrier frame and transverse to the direction of travel when in the lowered, use position. The lift frame may be raised to the full up position and rotated 90° to a longitudinal position so as to be aligned along the direction of travel for transport. The lift frame may also be raised to an intermediate height without rotation for elevating the working units above the soil to facilitate turning of the implement in a field such as at the end of a row. A common mechanism for raising/lowering and rotating the lift frame on the carrier frame includes an outer cornered tube coupled to the lift frame within which is inserted in a close-fitting manner a cornered lift post. The lift post is pivotally mounted to the carrier frame and is generally vertically oriented. A first bearing assembly is provided in the lift/rotate assembly to facilitate sliding displacement of the outer cornered tube on the inner lift post. A second bearing assembly facilitates pivoting displacement of the lift post on the carrier frame. A first hydraulic cylinder (or cylinders) couples the lift frame to the carrier frame for raising and lowering the lift frame and work units attached thereto. A second horizontal hydraulic cylinder couples the pivoting lift post to the carrier frame to rotate or swing the lift frame between the transverse and longitudinal positions. The lift/rotate mechanism including the telescoping arrangement of the cornered lift post and cornered sleeve maintains the distance between the lift post and the center of gravity of the lift frame substantially constant for all raised positions of the lift frame and reduces the time required for the raising and lowering operation. In addition, normally only one cylinder is required for raising the lift frame and another cylinder for rotating the lift frame, in minimizing the amount of hydraulic fluid required for moving the lift frame between the use and non-use positions.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. An agricultural implement adapted to be pulled by a tractor with a hitch and convertible between a use position and a transport position, said implement comprising: a carrier frame having a plurality of ground support wheels and aligned generally transverse to the direction of travel of said tractor; draft tongue means for pivotally connecting said carrier frame to said tractor hitch; lift frame means including a lift frame and a plurality of row units spaced along said frame, said lift frame further including a generally vertical sleeve and at least an integral center frame section extending generally transverse to the direction of travel of the implement; a cornered post mounted to said carrier frame for rotation about a vertical pivot axis, said cornered post sized for close-fitting sliding engagement with said sleeve; first power means coupling said lift frame to said carrier frame for moving said lift frame substantially vertically along said cornered post between at least a lowered use position and a raised transport position; and second power means connected between said cornered post and said carrier frame for rotating said post about said vertical pivot axis thereby to turn said lift frame to a longitudinal position for transport; and characterized in that the distance between said vertical pivot axis and the center of gravity of said lift frame remains substantially constant during raising and lowering of said lift frame.

2. The apparatus of claim 1 wherein said first power means further raises said lift frame to an intermediate location along the length of said post to raise said working units for facilitating turning of said tractor such as at an end of a row in a field with said lift frame in a transverse position.

3. The apparatus of claim 1 further comprising latch means for engaging said lift frame in said longitudinal position to secure said lift frame during transport.

4. The apparatus of claim 3 wherein said latch means is mounted to said draft tongue means and includes a spring-biased latch member for engaging said lift frame when rotated to said longitudinal position.

5. The apparatus of claim 1 further comprising guide/stabilizer means mounted to said carrier frame for engaging said lift frame when lowered to said use position and securely maintaining said lift frame generally transverse to the direction of travel.

6. The apparatus of claim 5 wherein said guide/stabilizer means includes at least one pair of spaced rails mounted to said carrier frame adapted to receive a cam follower coupled to said lift frame.

7. The apparatus of claim 6 wherein the spacing between said rails is greater adjacent respective upper end portions thereof to guide said cam follower between said spaced rails as said lift frame is lowered to the use position.

8. The apparatus of claim 1 further comprising low friction bearing means coupling said cornered post to said sleeve for facilitating sliding said sleeve along said lift post between said lowered use position and said upraised positions.

9. The apparatus of claim 8 wherein said cornered post is generally square in cross section and has vertically extended corner angles providing bearing surfaces; and wherein said bearing means includes a plurality of bearing pads engaging respective ones of said corner angles of said post in a continuous sliding engagement.

10. The apparatus of claim 9 further comprising means for adjusting the frictional engagement between said bearing pad of said sleeve and said corner angles of said post.

11. The apparatus of claim 10 wherein said adjusting means includes a plurality of threaded plug and screw combinations each mounted to said sleeve and engaging a respective bearing pad thereof for urging the associated pad inwardly.

12. The apparatus of claim 1 wherein said first power means includes a first hydraulic cylinder coupled to a pressurized hydraulic system of said tractor.

13. The apparatus of claim 12 wherein said second power means includes a second hydraulic cylinder coupled to said pressurized hydraulic system of said tractor.

14. The apparatus of claim 1 further comprising bearing means for mounting the lower portion of said cornered post to said carrier frame for rotation of said post.

15. The apparatus of claim 1 further comprising adjustable stop means mounted to said carrier frame for limiting rotation of said lift frame about said vertical pivot axis when rotated to said longitudinal position.

16. An agricultural implement adapted to be pulled by a tractor with a hitch and convertible between a use position and a transport position, comprising: a carrier frame including a plurality of ground support wheels; draft means connected to said carrier frame for connecting said carrier frame to the tractor hitch; a lift frame assembly including a laterally elongated integral lift frame and plurality of work units spaced along said lift frame, said lift frame being extended in a direction transverse of the direction of travel of said tractor when said lift frame is in the use position; power sliding lift means mounting said lift frame to said carrier frame for selective raising and lowering said lift frame assembly along a vertical axis between (i) a lowered use position in which said work units are in a working relation with the soil; (ii) an intermediate raised position wherein said work units are raised to permit said implement to turn, and (iii) a second raised position above said first raised position, wherein all of said work units are above said carrier frame, said implement characterized in that the distance between said vertical axis and the center of gravity of said lift frame remains substantially constant as said lift frame is raised and lowered, and wherein said power sliding lift means includes first bearing means for sliding engagement between said lift frame and said carrier frame; power swing means coupled to said power sliding lift means for rotating said lift frame in said second raised position about said vertical axis between a transverse position and a longitudinal position wherein said lift frame is generally aligned with the direction of travel; and second bearing means for mounting said lift frame assembly to said carrier frame for rotation between said transverse and longitudinal positions.

17. The apparatus of claim 16 further comprising latch means for engaging and maintaining said lift frame assembly generally horizontal and longitudinal of the direction of travel in said second raised position.

18. The apparatus of claim 17 further comprising alignment means mounted to said carrier frame for engaging said lift frame when in the lowered use position to maintain said lift frame assembly aligned with said carrier frame and generally transverse to the direction of travel.

19. The apparatus of claim 16 wherein said work units are ground-engaging units.

20. The apparatus of claim 19 wherein said work units include a plurality of push-type and pull-type planter row units mounted to said lift frame and wherein said draft means is telescoping.

21. The apparatus of claim 20 wherein said lift frame includes a forward mounting bar and an aft mounting bar, wherein said push-type planter row units are mounted to said forward mounting bar and said pull-type planter units are mounted to said aft mounting bar, and wherein said pull-type planter units are laterally offset from said push-type planter units.

22. In an agricultural implement adapted to be drawn by a tractor and including a carrier frame provided with support wheels, and a lift frame carried by said carrier frame, the improvement comprising: a lift post mounted to said carrier frame for rotation about a vertical axis; a sleeve mounted on said lift frame and slidably received on said lift post for vertical movement relative to said carrier frame between a lowered position and at least one raised position; a first power means for raising said lift frame relative to said carrier frame; and a second power means for turning said lift post about said vertical axis; said sleeve and said post being constructed and arranged such that said sleeve is in rotational driving engagement with said lift post in at least said raised position, whereby when said lift frame is moved to said raised position by said first power means, said sleeve and said lift post are in rotational driving engagement and said second power means may be actuated to turn said post and said lift frame to position said lift frame longitudinally of the direction of travel.

23. The apparatus of claim 22 wherein said vertical axis of said lift post is located substantially on the longitudinal center line of said implement, and said implement is characterized in that said lift frame is raised and lowered in a substantially vertical direction whereby the distance between said vertical axis of said lift post and the center of gravity of said lift frame remains substantially constant.

* * * * *